United States Patent [19]

Mongoin et al.

[11] Patent Number: 5,275,650
[45] Date of Patent: * Jan. 4, 1994

[54] AGENT FOR GRINDING LIME TO AUGMENT ITS REACTIVITY

[75] Inventors: Jacques Mongoin, Lyons; Georges Ravet, Saint-Genis-Les-Ollieres; Jean-Marc Suau, Lyons, all of France

[73] Assignee: Coatex S.A., Caluire, France

[*] Notice: The portion of the term of this patent subsequent to Jun. 27, 2006 has been disclaimed.

[21] Appl. No.: 982,006

[22] Filed: Nov. 24, 1992

Related U.S. Application Data

[63] Continuation of Ser. No. 817,970, Jan. 8, 1992, abandoned, which is a continuation of Ser. No. 260,266, Oct. 20, 1988, abandoned.

[30] Foreign Application Priority Data

Oct. 23, 1987 [FR] France .................. 87 14956

[51] Int. Cl.$^5$ .................................................. C09C 1/02
[52] U.S. Cl. ................................ 106/465; 241/16
[58] Field of Search ............ 106/461, 465, 469, 471; 241/15, 16

[56] References Cited

U.S. PATENT DOCUMENTS

| | | | |
|---|---|---|---|
| 3,604,634 | 9/1971 | Windle | 241/16 |
| 3,797,610 | 3/1974 | Windle | 106/464 |
| 4,175,975 | 11/1979 | MacWilliams et al. | 106/100 |
| 4,242,318 | 12/1980 | Brahm et al. | 423/430 |
| 4,509,987 | 4/1985 | Farrar et al. | 106/465 |
| 4,530,954 | 7/1985 | Arpin | 524/425 |
| 4,554,307 | 11/1985 | Farrar et al. | 524/425 |
| 4,687,789 | 8/1987 | Gonnet et al. | 524/425 |
| 4,775,420 | 10/1988 | Gonnet et al. | 524/425 |
| 4,840,985 | 6/1989 | Gonnet et al. | 106/645 |
| 4,845,191 | 7/1989 | Hautier | 528/493 |
| 4,852,651 | 6/1989 | Ravet et al. | 524/445 |
| 4,868,228 | 9/1989 | Gonnet et al. | 524/425 |

FOREIGN PATENT DOCUMENTS

| | | |
|---|---|---|
| 2031109 | 6/1970 | Fed. Rep. of Germany . |
| 2351706 | 5/1976 | France . |
| 2539137 | 7/1984 | France . |
| 41-01350 | 2/1966 | Japan ............ 106/464 |
| 56-167760 | 12/1981 | Japan ............ 106/464 |

OTHER PUBLICATIONS

Applied Optics, vol. 11, No. 2 (Feb. 1972) by J. Cornillault, "Particle Size Analyzer."
Brochure of CILAS regarding the Laser Granulometer model 715.

Primary Examiner—Gary P. Straub
Attorney, Agent, or Firm—Oblon, Spivak, McClelland, Maier & Neustadt

[57] ABSTRACT

A grinding agent for refining coarse lime by grinding in an aqueous medium to a microparticulate size, composed of a water-soluble ethylene polymer and/or copolymer, wherein, said grinding agent:

a) is formed from a least one monocarboxylic ethylenically unsaturated monomer, and b) has an average molecular weight of between 200 and 1,900 g/mole.

Grinding in the presence of the grinding agent allows the production of aqueous lime suspensions which have a high concentration of dry material expressed in weight percent, preferably between 40% and 60%, with particles of a size of less than 4 microns and median diameter of less than 2.9 microns.

10 Claims, 1 Drawing Sheet

AGENT FOR GRINDING LIME TO AUGMENT ITS REACTIVITY

This application is a Continuation of application Ser. No. 07/817,970, filed on Jan. 8, 1992, now abandoned, which was a continuation of 07/260,266, filed on Oct. 20, 1988, now abandoned.

BACKGROUND OF THE INVENTION

1. Field of the Invention

The present invention relates to an agent for grinding coarse lime in an aqueous medium for the production of rheologically stable aqueous suspensions of refined lime. The invention also relates to a method for grinding the coarse lime in an aqueous medium in the presence of the grinding agent, the aqueous suspensions of lime produced thereby, and the new chemical applications of the aqueous suspensions of lime refined by grinding in the presence of the agent.

2. Discussion of the Background

For a long time hydrated lime (or calcium hydroxide) has been used in numerous fields in the form of aqueous suspensions, known under the name of milk of lime, whose particles, often rough and irregular, were responsible for poor reactivity and considerable sedimentation. Such aqueous suspensions of lime were, nevertheless, used as chemical neutralization agents or even as antiseptic agents although the lime had a low coefficient of solubility in an aqueous medium.

Since this mineral substance is obtained first by calcining calcium carbonate at a high temperature, then by refining the calcined product by dry grinding or even by grinding in the presence of a small amount water, the lime produced by said refining, whether or not it is hydrated, is in the form of aggregates whose very rough grain size is in the range of from 5 to 20 microns.

By definition, particles of hydrated lime with such a rough grain size provide low reactivity when they are used in this state, both in a pulverized form and in the form of an aqueous suspension, even in the presence of an additive such as a dispersion agent.

Therefore, in order to be able to increase the reactivity of the lime, over the last few years it has been shown to be desirable to improve the fineness until a particle size of preferably less than 5 microns has been achieved and, where it is in the form of a pigmentary aqueous suspension, to increase the dry matter concentration at the same time as refining the particles.

To achieve the object of a particle size of preferably less than 5 microns, it has been shown to be desirable to carry out more effective grinding using one or other of the wet or dry methods.

Where dry grinding is used, the ground mineral materials must undergo a size selection so as to collect the finest particles desirably sought and to recycle all the particles having too large a size as many times as necessary to convert them to the desired size or, as far as possible, to remove them. Such a recycling and/or removal operation of the oversized particles remains impractical since the cost of the operation would be industrially unacceptable.

Where wet grinding is used, the suspension resulting from said grinding is presently naturally limited to an industrial concentration in dry matter of at most 20% by weight due to the increase noted in the viscosities, whether the grinding is carried out in water alone or in an aqueous medium in the presence of a dispersion agent of mineral or organic origin.

This second method consists of using, during grinding operations in an aqueous medium, more and more elaborate grinding agents so as to facilitate the carrying out of said grinding, the dispersion of the particles, and the maintaining of the viscosities of the suspensions produced at acceptable levels.

A first type of dispersion agent which could be considered as a grinding agent (described in patents GB 2,127,395 and FR 2,351,706) is composed of alkaline polyacrylates, polyphosphates and lignosulfonates. This agent, which is used in lime and/or calcium carbonate and even other mineral suspensions at a concentration of at least 40% by weight, is introduced after flocculation of the mineral materials with a polymer that is usually of a high molecular weight.

It is certain that the prior flocculating action causes the agglomeration of the particles by providing flakes with lessened chemical reactivity, which are favorably dispersed due to the presence of the dispersion agent.

However, while the purpose of this type of agent is essentially to provide a suspension with a low viscosity and a high concentration of dry material, this agent also provides an increase in particle diameter due to the formation of flakes and not the refining thereof as desired (GB 2,127,395) or due to the inability to refine to a particle size less than 4 microns (FR 2,351,706).

A second type of dispersion agent (described in French Patent 2,387,911) is composed of a salt of acrylic and maleic acid copolymers with an average molecular weight of between 2,000 and 10,000, which enables the production of pigmentary suspensions of calcium carbonate having amounts of dry material of between only 40% and 60% by weight. When such an agent, not in a suspension of calcium carbonate but in a suspension of lime at 40% by weight of dry material, is submitted to a grinding operation, there occurs a very rapid increase in the viscosity of the medium causing the blockage of the industrial grinding without, however, a substantial refinement of the lime particles being observed.

A third type of agent, described as a grinding agent in French Patent 2,539,137, is composed of acrylic acid polymers and/or copolymers simultaneously neutralized using lime and another neutralizing agent with a monovalent function. Such a grinding agent provides the stabilization of the rheological properties of calcium carbonate suspensions over time but, with regard to lime, does not provide the simultaneous increase in the concentration of dry material and a refining of the particles as it causes a large and rapid increase in viscosity, going as far as blocking the industrial grinder.

A last type of dispersion agent (described in European Patent 0,061,354) consists of polyelectrolytes with a low average molecular weight, which, however, is always greater than 2,200, such as carboxymethylcelluloses, acrylic and methacrylic acid polymers and lignosulfonates. The dispersion agents belonging to this family lead to good results when they are used for forming suspensions of rough lime particles which are always greater than 5 microns, but they cause a sudden and uncontrollable rise in the viscosity of such suspensions, going as far as blocking the industrial grinder, when they are used as grinding agents at concentrations of dry material on the order of 40% by weight or more.

SUMMARY OF THE INVENTION

Accordingly, it is an object of the present invention to provide novel grinding agents for the production of rheologically stable aqueous suspensions of lime which contain a high lime content and in which the lime has a fine particle size.

It is another object of the present invention to provide rheologically stable aqueous suspensions of lime which contain a high lime content and in which the lime particles have a fine particle size.

It is a further object of the present invention to provide a method for the grinding of lime to form rheologically stable aqueous suspensions which contain a high lime content and in which the lime has a fine particle size.

These and other objects which will become apparent during the description of the present invention have been achieved by the inventors' discovery of an agent for grinding lime in an aqueous medium which provides refined suspensions having at the same time a concentration in dry material of at least 20% by weight, a particle size of less than 4 microns, 50% of which have a size of less than 2.9 microns, and a low viscosity which is stable over time.

In accordance with the invention, the agent for grinding the rough lime to be refined in an aqueous medium to a microparticulate size, with a view to increasing the reactivity of the lime, is composed of a water-soluble ethylene polymer and/or copolymer, which is characterized in that said agent is a) formed from at least one monocarboxylic ethylenically unsaturated monomer; and b) selected within the range of average molecular weights of between 200 and 1900 g/mole.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawing, wherein.

DETAILED DESCRIPTION OF THE INVENTION

Figure 1:
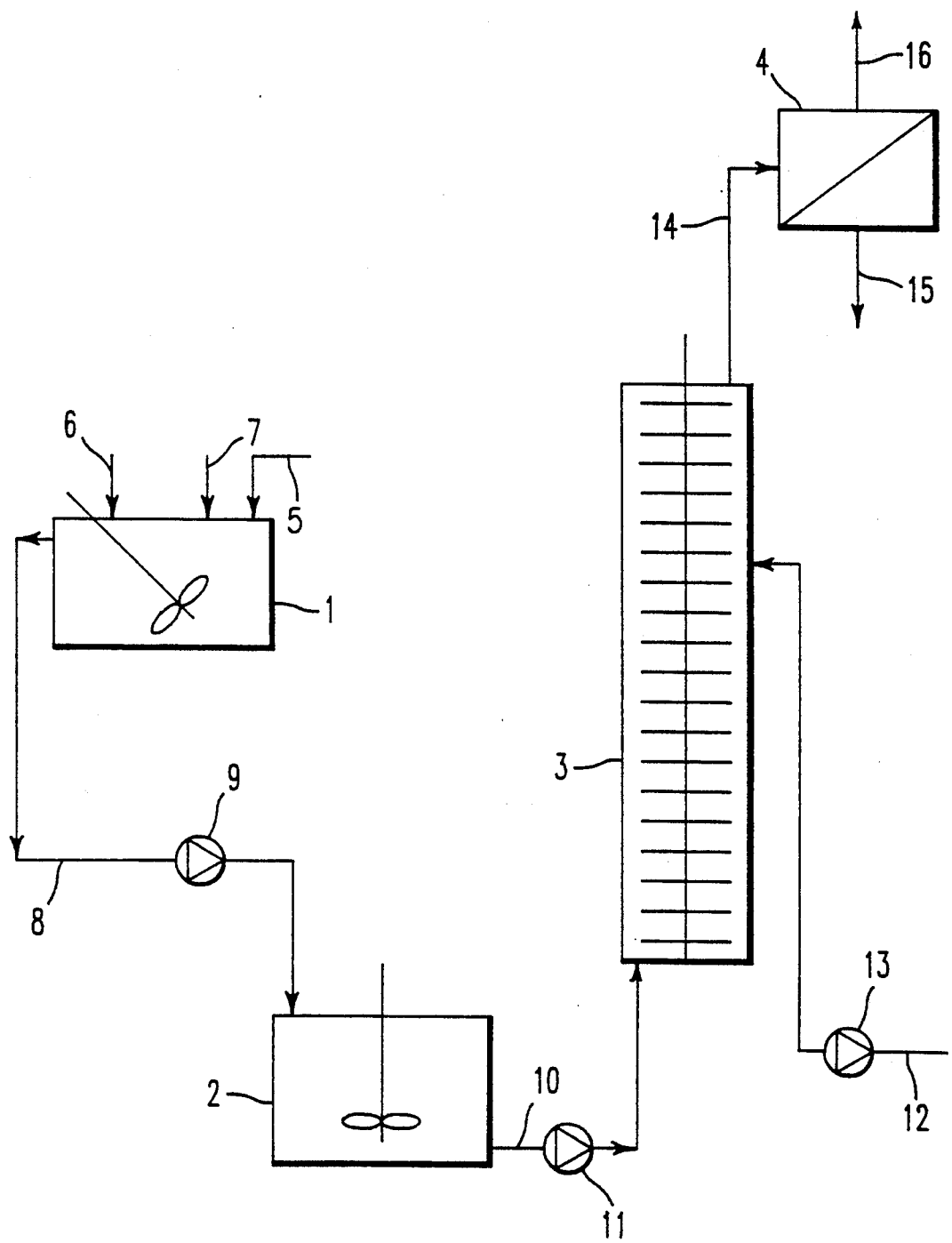
FIG. 1 is a representation of a pilot installation for grinding aqueous suspensions of lime in the presence of a grinding agent.

Therefore, while the prior art essentially describes dispersion and/or grinding agents using the wet method, certain of which are water-soluble ethylene polymers and/or copolymers, the grinding agents in accordance with the present invention are distinguished from the prior art by the fact that they are composed of at least one ethylene polymer and/or copolymer, which is required to be formed from at least one monocarboxylic ethylenically unsaturated monomer. In other words, any agent for grinding lime in an aqueous medium which does not at least partially contain said monomer is certain to provide the same effects as those caused by the agents of the prior art. That is, they give rise to a sudden and uncontrollable rise in the viscosity of the lime suspension, rendering refining impossible as soon as the concentration of dry material reaches or exceeds 40% by weight.

Further, the grinding agent of the present invention, based on at least one polymer and/or copolymer formed from at least one monocarboxylic ethylenically unsaturated monomer, must possess an average molecular weight in the above-identified range of between 200 and 1,900 g/mole.

Outside of this range of average molecular weights, any polymer having the same structure but with an average molecular weight of greater than 1,900, even close to said limit, leads to lime suspensions which are poorly ground or are even impossible to grind when the concentration of dry material in the suspension exceeds 40% by weight. In such cases, the characteristics of viscosity and particle size are poor.

Thus, the inventors have surprisingly discovered that the two above-identified conditions of the present invention cooperate fully and create a state of synergy, providing aqueous suspensions of microparticulate lime, highly concentrated in dry material, with low and stable viscosities, and whose particles have the desired size and a very much improved reactivity for the applications envisaged.

As previously stated, the grinding agent of the present invention is composed of at least one acid polymer and/or copolymer containing at least one monocarboxylic ethylenically unsaturated monomer.

The monocarboxylic ethylenically unsaturated monomer is preferably selected from among acrylic acid and methacrylic acid.

The other monomers used within the framework of the present invention can be itaconic acid, crotonic acid, fumaric acid, anhydrous maleic acid or even isocrotonic acid, aconitic acid, mesaconic acid, sinapinic acid, undecylenic acid, angelic acid, hydroxyacrylic acid, or even acrolein, acrylamide and its substitutes, acrylonitrile, acrylic and methacrylic acid esters and, in particular, $C_1$ to $C_8$ acrylate and methacrylate esters, as well as quaternized or non-quaternized dimethylaminoethyl methacrylate, imidazoles, vinylpyrrolidone, vinylcaprolactam, ethylene, propylene, isobutylene, diisobutylene, vinyl acetate, styrene and its substitutes, alphamethylstyrene, methylvinylketone, vinyl chlorides, hydroxyl monomers, more especially ethylene glycol and propylene glycol acrylates and methacrylates, as well as their phosphate, phosphonate, phosphonyl, sulfate, sulfone, nitrate and nitroso derivatives.

These acid polymers and/or copolymers result from the polymerization and/or copolymerization using known methods, in the presence of appropriate initiators and regulators, in an aqueous, alcoholic, aqueous-alcoholic, aromatic, or aliphatic medium or in a halogenated solvent, of at least one of the acrylic and/or methacrylic acid monomers.

Thus, the polymerization medium can be water, methanol, ethanol, propanol, isopropanol, butanols, or even dimethylformamide, dimethylsulfoxide, tetrahydrofuran, acetone, methylethylketone, ethyl acetate, butyl acetate, hexane, heptane, benzene, toluene, ethylbenzene, xylene, mercaptoethanol, tertiododecylmercaptan, thioglycolic acid and its esters, n-dodecylmercaptan, acetic acid, tartaric acid, lactic acid, citric acid, gluconic acid, glucoheptonic acid, 2-mercaptopropionic acid, thiodiethanol, halogenated solvents such as carbon tetrachloride, chloroform, methylene chloride, and methyl chloride and monopropyleneglycol or diethyleneglycol ethers.

The polymers and/or copolymers intended to be used as the grinding agents of the present invention are generally selected from among those having a molecular weight of between 200 and 1,900 and preferably between 500 and 1,500.

Immediately after the polymerization, the acid polymers and/or copolymers of the present invention in an aqueous solution are collected and can be used in this form.

In accordance with an alternative embodiment which has proved useful, the polymers and/or copolymers of the present invention in an aqueous solution can be completely or partially neutralized with a neutralizing agent having a monovalent function. In addition, a neutralizing agent having a polyvalent function can be combined with said monovalent agent.

In the first case, the neutralizing agent is preferably selected from the group consisting of alkali metals and similar cations, in particular lithium, sodium, potassium, ammonium, or polysubstituted ammonium. This agent, in the second case, can be combined with an agent from the alkaline earth or similar group, preferably calcium and magnesium, zinc or aluminum.

In practice, the liquid phase resulting from the polymerization and/or the copolymerization and containing the acid polymer and/or copolymer can be used as such for grinding the coarse lime to be refined, but it can also be dried by any known means in order to remove said liquid and isolate the polymer and/or copolymer in the form of a fine powder and can be used in said other form as a grinding agent.

The grinding agent of the present invention can be used in a method for the preparation of aqueous lime suspensions which comprises the following steps:

(a) The preparation of an aqueous suspension of coarse lime is carried out under stirring by first introducing all or part of the grinding agent into the aqueous phase and then introducing the lime so as to obtain a desirably homogeneous, fluid suspension;

(b) The suspension prepared in step (a) is introduced into a grinding area composed of a grinder with microelements;

(c) The temperature of the suspension during grinding is maintained at a level below 100° C. and preferably between room temperature and 50° C.;

(d) The suspension is ground in the presence of the micro-elements for the time necessary to obtain the desired average grain size;

(e) During the grinding, an additional fraction of the grinding agent is possibly introduced in at least one step;

(f) On exiting the grinder, the finely ground lime suspension is continuously separated from the grinding elements and the lime particles which are rejected as being too coarse;

(g) At least one rheology-modifying agent is possibly introduced into the suspension of finely ground lime.

The grinding agent in accordance with the invention is introduced into the aqueous lime suspension in an amount of from 0.05 to 2% by weight based the dry weight of the coarse mineral materials to be ground and, preferably, in an amount of from 0.5 to 1.5%.

Where at least one rheology-modifying agent is introduced into the lime suspension following grinding, it is selected from among those which have the property of adjusting the viscosity to a suitable value desired by the user for each subsequent application, or further to enhance the compatibility between the lime and other charges possibly introduced into the medium.

When said rheology-modifying agent is introduced into the suspension following grinding, it is in an amount of from 0.01% to 3% by weight based on the dry weight of the mineral materials.

The suspension collected following the grinding generally has a concentration of dry matter of at least 20% and preferably of between 40 and 60% by weight, a pigmentary particle size of less than 4 microns, with 50% thereof having a size of less than 2.9 microns (median size).

The lime suspensions refined in this manner in the presence of the grinding agent of the present invention can preferably be used for the neutralization of waters or industrial fumes, or even as a chemical neutralization agent in industrial synthesis processes, such as, for example, the production of calcium dodecylbenzenesulfonate, dispersion agents for phytosanitizations, lubricants, calcium soaps, antiseptic agents or surface treatment agents, due to the substantial increase in its reactivity which renders it equivalent to the alkaline hydroxides.

Other features of the invention will become apparent in the course of the following descriptions of the exemplary embodiments which are given for illustration of the invention and are not intended to be limiting thereof.

EXAMPLES

Example 1

This example, the object of which is to illustrate the prior technology, relates to the preparation of a suspension of coarse lime subjected to grinding so as to refine it to a microparticulate suspension.

For this purpose, several suspensions of coarse lime were prepared from a lime of the same origin (ULTRA-LEICHT from the Wulfrath deposit, sold by RHEINISCHE KALKSTEINWERKE GmbH) using various prior art grinding agents.

A first group of tests (Tests 1 and 2) demonstrate the preparation and the grinding of aqueous lime suspensions without any grinding agents and with a concentration of dry matter of from 20 to 30% by weight.

A second group of tests (Tests 3 to 5) demonstrate the preparation and the grinding of aqueous lime suspensions with different concentrations in the presence of a sodium polyacrylate having an average molecular weight of 2,400, sold under the trade name DISPEX N40.

A third group of tests (Tests 6 to 8) demonstrate the preparation and the grinding of aqueous lime suspensions with different concentrations in the presence of sodium polyacrylate having an average molecular weight of 2,500, sold under the trademark OROTAN 850.

A fourth group of tests (Tests 9 and 10) demonstrate the use in the lime suspensions to be ground of low molecular weight carboxymethylcellulose, sold under the trademark FINNFIX 5.

A fifth group of tests (Tests 11 to 13) demonstrate the use of a sodium polyacrylate having an average molecular weight of 4,000 as the grinding agent for the lime in aqueous suspension.

These tests were carried out under the same experimental conditions and in the same apparatus so that the results obtained could be compared.

For each test, an aqueous suspension of lime from the above-indicated source and having a grain size of less than 26 microns was prepared.

The aqueous suspension had a variable concentration in dry matter expressed as a weight percentage of the total volume, in the amounts indicated in the following table.

The grinding agent was present in said suspension in the quantities indicated in the following table, expressed as a weight percentage based on the amount of dry lime to be ground.

The suspension prepared in this manner was placed in a Dyno-Mill type grinder with a fixed cylinder and a turning impeller, whose grinding component was composed of corundum bearings having a diameter of between 0.6 millimeters and 1.0 millimeters.

The total volume occupied by the grinding component was 5000 ml, while its weight was 10 kg. The grinding chamber had a volume of 5000 ml.

The circumferential speed of the grinder was 10 meters per second. The lime suspension was recycled at a rate of 50 liters per hour.

The exit of the Dyno-Mill grinder was provided with a 300 micron mesh separator, which enabled the suspension resulting from the grinding and the grinding body to be separated.

During each grinding test the temperature was maintained at 25° C.

The grinding time under the above-identified experimental conditions was variable and at most equal to 90 minutes when grinding was possible.

At the end of the grinding, the viscosity of the microparticulate suspension was measured using a Brookfield viscometer, at a temperature of 20° C. and at rotation speeds of 10 and 100 revolutions per minute. After a rest time of 24 hours, the viscosity of each suspension was again measured after brief stirring.

Similarly, at the end of the grinding, the grain size was determined using an H R 850 laser granulometer made by CILAS ALCATEL.

All the experimental results of Tests 1 to 13 are given in Table I.

TABLE I

| Test No. | Grinding Agent | Molecular Weight of the Grinding Agent | Concentration of the Lime in weight % | % of the Grinding Agent in dry/dry | Grinding Time in minutes | Median Diameter after Grinding in μm | Brookfield Viscosity (mPs) Exit Grinding | | 24 hrs. after Grinding | |
|---|---|---|---|---|---|---|---|---|---|---|
| | | | | | | | 10 rpm | 100 rpm | 10 rpm | 100 rpm |
| 1 | None | — | 20 | 0 | 39 | 2.3 | 4,500 | 480 | 5,000 | 520 |
| 2 | | — | 30 | 0 | Grinding impossible | | | | | |
| 3 | Dispex N 40 | 2,400 | 30 | 1 | 48 | 2.7 | 3,000 | 365 | 3,500 | 410 |
| 4 | Dispex N 40 | 2,400 | 45 | 1.5 | 22 | 3.2 | 2,300 | 345 | 2,600 | 390 |
| 5 | Dispex N 40 | 2,400 | 50 | 1.5 | 16 | 3.8 | 2,400 | 450 | 2,800 | 490 |
| 6 | Orotan 850 | 2,500 | 30 | 1 | 62 | 2.8 | 3,500 | 415 | 3,700 | 470 |
| 7 | Orotan 850 | 2,500 | 40 | 1 | 6 | 4.3 | 2,450 | 355 | 2,700 | 410 |
| 8 | Orotan 850 | 2,500 | 50 | 1.5 | Grinding impossible | | | | | |
| 9 | Finnfix 5 | Non-comparative polycyclic chemical structure | 30 | 1 | 5 | 4.5 | 3,500 | 540 | 4,000 | 610 |
| 10 | Finnfix 5 | | 40 | 1.5 | Grinding impossible | | | | | |
| 11 | COATEX DT 450 | 4,000 | 30 | 1 | 16 | 2.6 | 3,500 | 450 | 3,700 | 490 |
| 12 | COATEX DT 450 | 4,000 | 45 | 1.5 | 21 | 3.3 | 3,500 | 400 | 3,650 | 470 |
| 13 | COATEX DT 450 | 4,000 | 50 | 2 | Grinding impossible | | | | | |

Table I shows that the grinding of the lime in an aqueous medium without the assistance of a grinding agent is possible only insofar as the concentration in dry matter is approximately 20% by weight (median diameter of the particles after grinding: 2.3 microns). At higher concentrations, the grinding of the lime is shown to be impossible.

As also shown in Table I, the grinding of the lime in an aqueous medium with the assistance of a grinding agent, selected from among those of the prior art having the lowest average molecular weight, is possible and gives good results when the lime concentration is on the order of 30% by weight. At higher concentrations however, the median diameter of the ground particles remains greater than 3 microns when grinding is still possible, that is, when the concentration of lime is less than 40% by weight.

Example 2

This example, which is intended to illustrate the present invention, relates to the grinding of the same coarse lime used in Example 1 in the presence of a grinding agent composed of acid homopolymers having average molecular weights varying between 800 to 7,000 which are salified with the sodium ion.

For this purpose, several tests were carried out with acrylic acid homopolymers (Tests 14 to 31) and methacrylic acid homopolymers (Tests 32 and 33), while varying the concentrations of the lime suspensions subjected to grinding from 30 to 50% by weight.

All these tests were carried out using the same conditions and apparatus as those in Example 1. The results of these various tests are collected in Table II below.

TABLE II

| Test No. | Grinding Agent | Molecular Weight of the Grinding Agent | Concentration of the Lime in weight % | % of the Grinding Agent in dry/dry | Grinding Time in minutes | Median Diameter after Grinding in μm | Brookfield Viscosity (mPs) Exit Grinding | | 24 hrs. after Grinding | |
|---|---|---|---|---|---|---|---|---|---|---|
| | | | | | | | 10 rpm | 100 rpm | 10 rpm | 100 rpm |
| 14 | poly(acrylic acid) | 800 | 30 | 1 | 82 | 1.9 | 3,000 | 400 | 3,250 | 430 |
| 15 | " | 800 | 45 | 1.5 | 40 | 2.4 | 6,500 | 650 | 7,000 | 690 |
| 16 | " | 800 | 50 | 1.5 | 35 | 2.6 | 2,800 | 420 | 3,100 | 465 |
| 17 | " | 1,000 | 30 | 1 | 68 | 2 | 3,100 | 450 | 3,300 | 470 |

TABLE II-continued

| Test No. | Grinding Agent | Molecular Weight of the Grinding Agent | Concentration of the Lime in weight % | % of the Grinding Agent in dry/dry | Grinding Time in minutes | Median Diameter after Grinding in μm | Brookfield Viscosity (mPs) | | | |
|---|---|---|---|---|---|---|---|---|---|---|
| | | | | | | | Exit Grinding | | 24 hrs. after Grinding | |
| | | | | | | | 10 rpm | 100 rpm | 10 rpm | 100 rpm |
| 18 | " | 1,000 | 45 | 1.5 | 40 | 2.6 | 6,000 | 600 | 6,500 | 640 |
| 19 | " | 1,000 | 50 | 1.5 | 33 | 2.7 | 3,000 | 440 | 3,200 | 470 |
| 20 | " | 1,800 | 30 | 1 | 70 | 2 | 3,000 | 410 | 3,200 | 440 |
| 21 | " | 1,800 | 45 | 1.5 | 37 | 2.7 | 6,200 | 630 | 6,600 | 685 |
| 22 | " | 1,800 | 50 | 1.5 | 31 | 2.8 | 3,150 | 450 | 3,500 | 500 |
| 23 | " | 2,200 | 30 | 1 | 47 | 2.2 | 3,300 | 520 | 3,700 | 590 |
| 24 | " | 2,200 | 45 | 1.5 | 30 | 3.2 | 4,500 | 470 | 5,000 | 510 |
| 25 | " | 2,200 | 50 | 1.5 | 15 | 4 | 2,300 | 370 | 2,850 | 420 |
| 26 | " | 4,000 | 30 | 1 | 16 | 2.6 | 3,500 | 450 | 3,900 | 490 |
| 27 | " | 4,000 | 45 | 1.5 | 21 | 3.3 | 3,700 | 440 | 3,850 | 475 |
| 28 | " | 4,000 | 50 | 1.5 | 5 | 5.0 | 2,100 | 310 | 2,600 | 360 |
| 29 | " | 7,000 | 30 | 1 | 17 | 2.6 | 4,600 | 500 | 4,900 | 550 |
| 30 | " | 7,000 | 45 | 1.5 | 5 | 3.9 | 1,400 | 200 | 2,500 | 380 |
| 31 | " | 7,000 | 50 | 1.5 | | Grinding impossible | | | | |
| 32 | poly(methacrylic acid) | 1,300 | 30 | 1 | 61 | 2 | 3,400 | 470 | 3,550 | 490 |
| 33 | " | 1,300 | 45 | 1.5 | 33 | 2.7 | 3,500 | 420 | 3,700 | 500 |

Table II shows that the efficacy of the grinding agent of the present invention, with a molecular weight of less than 1,900, was excellent and provided suspensions of finely ground lime in which the average particle size was less than 2.9 microns.

Such is the case with Tests 14 to 22, in which the grinding agent was an acrylic acid homopolymer, and with Tests 32 and 33, in which the grinding agent was a methacrylic acid homopolymer.

All the other tests (Tests 23 to 31), in which the grinding agent had a molecular weight above 1,900, provided results which worsened as the average molecular weight increased.

Example 3

This example, which is intended to illustrate the present invention, relates to the grinding of the same coarse lime used in the preceding examples in the presence of grinding agents which are copolymers of acrylic acid (85% by weight) and dimethylaminoethyl methacrylate (15% by weight) quaternized with methyl chloride, with average molecular weights varying from 500 to 2,500 and salified with the sodium ion.

Several tests were carried out (Tests 34 to 48), with the aqueous lime suspension concentration of dry matter varying from 30 to 45% by weight.

These tests were carried out using the same method and technological means as in Example 1. The results from these tests are given in Table III below.

TABLE III

| Test No. | Molecular Weight of the Grinding Agent | Concentration of the Lime in weight % | % of the Grinding Agent in dry/dry | Grinding Time in minutes | Median Diameter after Grinding in μm | Brookfield Viscosity (mPs) | | | |
|---|---|---|---|---|---|---|---|---|---|
| | | | | | | Exit Grinding | | 24 hrs. after Grinding | |
| | | | | | | 10 rpm | 100 rpm | 10 rpm | 100 rpm |
| 34 | 500 | 30 | 1 | 68 | 2 | 3,300 | 460 | 3,550 | 485 |
| 35 | 500 | 40 | 1 | 25 | 2.7 | 3,700 | 540 | 3,950 | 575 |
| 36 | 500 | 45 | 1.5 | 19 | 2.7 | 3,250 | 340 | 3,500 | 365 |
| 37 | 1,000 | 30 | 1 | 80 | 1.9 | 4,450 | 560 | 4,800 | 600 |
| 38 | 1,000 | 40 | 1 | 32 | 2.6 | 3,950 | 420 | 4,150 | 455 |
| 39 | 1,000 | 45 | 1.5 | 43 | 2.1 | 3,400 | 390 | 3,650 | 420 |
| 40 | 1,600 | 30 | 1 | 75 | 2 | 4,400 | 540 | 4,700 | 575 |
| 41 | 1,600 | 40 | 1 | 30 | 2.6 | 3,400 | 400 | 3,500 | 430 |
| 42 | 1,600 | 45 | 1.5 | 19 | 2.8 | 3,200 | 370 | 3,450 | 410 |
| 43 | 1,800 | 30 | 1 | 70 | 2 | 3,600 | 480 | 4,000 | 510 |
| 44 | 1,800 | 40 | 1 | 20 | 2.7 | 3,500 | 450 | 4,050 | 490 |
| 45 | 1,800 | 45 | 1.5 | 17 | 2.8 | 3,100 | 350 | 3,300 | 400 |
| 46 | 2,500 | 30 | 1 | 60 | 2.3 | 3,200 | 400 | 3,500 | 470 |
| 47 | 2,500 | 40 | 1 | 6 | 3.6 | 3,800 | 450 | 4,250 | 525 |
| 48 | 2,500 | 45 | 1.5 | 9 | 4 | 3,400 | 380 | 3,700 | 460 |

It can be seen from Table III that the efficacy of the grinding agents composed of said copolymers is equal to that observed for the homopolymers of Example 2, since such agents lead to an average ground particle size of less than 2.9 microns, provided that the average molecular weight of said copolymers is less than 1,900.

Under the conditions of Tables II and III, the grinding agent of the present invention, defined as a polymer and/or copolymer based on at least one carboxylic ethylenically unsaturated monomer having an average molecular weight of preferably between 500 and 1,900, is seen to display superior results.

Example 4

This example, which is intended to illustrate the present invention, relates to the grinding of the same coarse lime used in the preceding examples in the presence of grinding agents composed of copolymers of acrylic acid (75% by weight) and acrylamide (25% by weight) having average molecular weights varying from 700 to 3,200 and salified with the sodium ion.

Several tests were carried out (Tests 49 to 60), with the aqueous suspensions of lime undergoing grinding having concentrations of dry matter varying from 30 to 45% by weight.

These tests were carried out with the same method and technological means as in Example 1. The results of these tests are given in Table IV below.

TABLE IV

| Test No. | Molecular Weight of the Grinding Agent | Concentration of the Lime in weight % | % of the Grinding Agent in dry/dry | Grinding Time in minutes | Median Diameter after Grinding in μm | Brookfield Viscosity (mPs) | | | |
|---|---|---|---|---|---|---|---|---|---|
| | | | | | | Exit Grinding | | 24 hrs. after Grinding | |
| | | | | | | 10 rpm | 100 rpm | 10 rpm | 100 rpm |
| 49 | 700 | 30 | 1 | 80 | 2 | 3,900 | 470 | 4,250 | 520 |
| 50 | 700 | 40 | 1 | 20 | 2.6 | 3,600 | 450 | 3,900 | 475 |
| 51 | 700 | 45 | 1.5 | 28 | 2.5 | 3,400 | 500 | 3,700 | 540 |
| 52 | 1,000 | 30 | 1 | 90 | 1.9 | 4,100 | 500 | 4,400 | 545 |
| 53 | 1,000 | 40 | 1 | 23 | 2.5 | 3,650 | 465 | 4,000 | 500 |
| 54 | 1,000 | 45 | 1.5 | 29 | 2.5 | 3,000 | 420 | 3,250 | 440 |
| 55 | 1,500 | 30 | 1 | 83 | 2 | 3,800 | 490 | 4,150 | 520 |
| 56 | 1,500 | 40 | 1 | 14 | 2.7 | 3,700 | 480 | 4,000 | 510 |
| 57 | 1,500 | 45 | 1.5 | 25 | 2.7 | 3,300 | 460 | 3,550 | 485 |
| 58 | 3,200 | 30 | 1 | 54 | 2.4 | 5,200 | 620 | 5,500 | 670 |
| 59 | 3,200 | 40 | 1 | 9 | 3.3 | 3,700 | 490 | 4,000 | 520 |
| 60 | 3,200 | 45 | 1.5 | 7 | 3.9 | 3,150 | 420 | 3,300 | 450 |

It can be seen from Table IV that the efficacy of the grinding agents composed of said copolymers is equal to that observed for the homopolymers of Example 2, since they provide an average ground particle size of less than 2.9 microns, provided that the average molecular weight of said copolymers is less than 1,900.

Under the conditions of Tables II to IV, the grinding agent of the present invention, defined as a polymer and/or copolymer based on at least one carboxylic ethylenically unsaturated monomer having an average molecular weight of between 500 and 1,900, is seen to display superior results.

Example 5

This example, which is intended to illustrate the present invention, relates to the grinding of the same coarse lime used in the preceding examples in the presence of a grinding agent composed of copolymers of acrylic acid (85% by weight) and butyl acrylate (15% by weight) with average molecular weights varying from 800 to 4,500 and salified with the sodium ion.

Several tests were carried out (Tests 61 to 77), with the aqueous lime suspension concentration of dry matter varying from 30 to 55% by weight.

These tests were carried out using the same method and technological means as in Example 1. The results of these tests are given in Table V below.

TABLE V

| Test No. | Molecular Weight of the Grinding Agent | Concentration of the Lime in weight % | % of the Grinding Agent in dry/dry | Grinding Time in minutes | Median Diameter after Grinding in μm | Brookfield Viscosity (mPs) | | | |
|---|---|---|---|---|---|---|---|---|---|
| | | | | | | Exit Grinding | | 24 hrs. after Grinding | |
| | | | | | | 10 rpm | 100 rpm | 10 rpm | 100 rpm |
| 61 | 800 | 30 | 1 | 80 | 2 | 4,000 | 440 | 4,150 | 460 |
| 62 | 800 | 40 | 1 | 23 | 2.5 | 3,550 | 420 | 3,750 | 455 |
| 63 | 800 | 45 | 1.5 | 30 | 2.5 | 4,100 | 380 | 4,250 | 410 |
| 64 | 800 | 50 | 1.5 | 28 | 2.6 | 5,000 | 520 | 5,450 | 580 |
| 65 | 1,200 | 40 | 1 | 27 | 2.4 | 2,750 | 350 | 3,100 | 385 |
| 66 | 1,200 | 45 | 1.5 | 39 | 2.2 | 3,300 | 340 | 3,560 | 375 |
| 67 | 1,200 | 50 | 1.5 | 38 | 2.2 | 3,500 | 400 | 3,750 | 430 |
| 68 | 1,200 | 55 | 1.5 | 30 | 2.6 | 5,200 | 550 | 5,500 | 600 |
| 69 | 1,500 | 30 | 1 | 79 | 1.9 | 3,800 | 440 | 3,950 | 470 |
| 70 | 1,500 | 40 | 1 | 21 | 2.6 | 3,700 | 480 | 4,100 | 500 |
| 71 | 1,500 | 45 | 1.5 | 38 | 2.2 | 4,000 | 410 | 4,250 | 440 |
| 72 | 2,500 | 30 | 1 | 63 | 2.2 | 3,500 | 410 | 3,900 | 450 |
| 73 | 2,500 | 40 | 1 | 15 | 3.1 | 3,200 | 390 | 3,500 | 420 |
| 74 | 2,500 | 45 | 1.5 | 17 | 3.2 | 3,300 | 360 | 3,600 | 400 |
| 75 | 4,500 | 30 | 1 | 54 | 2.4 | 4,400 | 450 | 4,800 | 465 |
| 76 | 4,500 | 40 | 1 | 10 | 3.1 | 3,500 | 380 | 4,100 | 420 |
| 77 | 4,500 | 45 | 1.5 | 9 | 3.3 | 2,500 | 350 | 2,800 | 400 |

It can be seen from Table V that the efficacy of the grinding agents composed of said copolymers is equal to that observed for the homopolymers of Example 2, since they provide an average ground particle size of less than 2.9 microns, provided that the average molecular weight of said copolymers is less than 1,900.

Under the conditions of Tables II to V, the grinding agent of the present invention, defined as a polymer and/or copolymer based on at least one carboxylic ethylenically unsaturated monomer having an average molecular weight of between 500 and 1,900, is seen to display superior results.

In accordance with these same tables and in comparison with Table I, it is apparent that the concentration of dry matter of the aqueous suspensions of lime to be ground can reach values as high as 55% by weight in the presence of the grinding agent of the present invention.

Example 6

This example, which is intended to illustrate the present invention, relates to the grinding of the same coarse lime used in the preceding examples in the presence of a grinding agent composed of copolymers of acrylic acid (85% by weight) and methyl methacrylate (15% by weight) with average molecular weights varying from 800 to 2,500 and salified with the sodium ion.

Several tests were carried out (Tests 78 to 86), with the aqueous lime suspension concentration of dry matter varying from 30 to 45% by weight.

These tests were carried out using the same method and technological means as in Example 1. The results of these tests are given in Table VI below, and enable the same conclusions to be drawn as in Examples 2 to 5.

TABLE VI

| Test No. | Molecular Weight of the Grinding Agent | Concentration of the Lime in weight % | % of the Grinding Agent in dry/dry | Grinding Time in minutes | Median Diameter after Grinding in μm | Brookfield Viscosity (mPs) | | | |
|---|---|---|---|---|---|---|---|---|---|
| | | | | | | Exit Grinding | | 24 hrs. after Grinding | |
| | | | | | | 10 rpm | 100 rpm | 10 rpm | 100 rpm |
| 78 | 800 | 30 | 1 | 82 | 1.9 | 3,200 | 410 | 3,400 | 445 |
| 79 | 800 | 40 | 1 | 34 | 2.4 | 4,100 | 450 | 4,450 | 480 |
| 80 | 800 | 45 | 1.5 | 44 | 2.3 | 4,900 | 550 | 5,300 | 600 |
| 81 | 1,500 | 30 | 1 | 80 | 1.9 | 3,800 | 460 | 4,100 | 500 |
| 82 | 1,500 | 40 | 1 | 32 | 2.4 | 3,600 | 420 | 3,900 | 465 |
| 83 | 1,500 | 45 | 1.5 | 40 | 2.6 | 4,000 | 495 | 4,300 | 530 |
| 84 | 2,500 | 30 | 1 | 53 | 2.4 | 3,000 | 455 | 3,800 | 500 |
| 85 | 2,500 | 40 | 1 | 21 | 3.3 | 3,300 | 410 | 3,750 | 470 |
| 86 | 2,500 | 45 | 1.5 | 25 | 3.4 | 3,100 | 400 | 3,600 | 450 |

Example 7

This example, which is intended to illustrate the present invention, relates to the grinding of the same coarse lime used in the preceding examples in the presence of a grinding agent composed of an acrylic acid homopolymer with an average molecular weight of 800, in a form salified with sodium, lithium, ammonium, or potassium ions, or in an acid form, or even completely neutralized by a combination of sodium and calcium ions at a rate of 0.5 for each.

Several tests were carried out (Tests 87 to 92), with the aqueous lime suspensions undergoing grinding having concentrations of dry matter fixed at 45% by weight.

These tests were carried out using the same method and technological means as in Example 1. The results of these tests are given in Table VII below.

TABLE VII

| Test No. | Agent and Rate of Salification | Grinding Time in minutes | Median Diameter in μm | Brookfield Viscosity in mPs Exit Grinding | |
|---|---|---|---|---|---|
| | | | | 10 rpm | 100 rpm |
| 87 | Na:1.0 | 40 | 2.4 | 6,500 | 650 |
| 88 | Li:1.0 | 52 | 2.0 | 3,500 | 470 |
| 89 | NH4:1.0 | 15 | 2.9 | 2,400 | 390 |
| 90 | K:1.0 | 29 | 2.3 | 4,700 | 430 |
| 91 | Acid | 16 | 2.9 | 3,050 | 430 |
| 92 | Na:0.5 Ca:0.5 | 27 | 2.7 | 3,100 | 350 |

As can be seen from Table VII, the grinding agents of the present invention provide aqueous suspensions with an average ground particle size of less than 2.9 microns, regardless of the degree of neutralization or the nature of the neutralizing agent.

Example 8

This example illustrates the semi-industrial application of the present invention by use of the grinding agent in an aqueous suspension of lime to be refined which is intended, after having undergone grinding, to be used for neutralizing gaseous acid effluents.

For this purpose and in accordance with FIG. 1, a pilot installation was used which comprises a slaking tank (1) provided with stirring means, a buffer tank (2) kept under stirring, a grinder (3) with micro-elements and a separation zone (4).

The necessary water was introduced into the slaking tank (1) through pipe (5), then the grinding agent of the present invention was introduced through pipe (6) and finally the lime to be refined was introduced through pipe (7).

The suspension formed in this manner was maintained under stirring in said tank for approximately 15 minutes.

The aqueous suspension in the slaking tank had the following composition, expressed in weight percent:

| | |
|---|---|
| lime (Ca(OH)$_2$ 100%) | 50% |
| grinding agent, copolymer of acrylic acid (85%) and butyl acrylate (15%), dry/dry, with a molecular weight of 1,200 salified with the sodium ion | 1% |
| water | 49% |

The slaked aqueous suspension was transferred from the slaking tank (1) to the buffer tank (2) through pipe (8) provided with pump (9).

The buffer tank (2) provided with a stirring means ensured the regular supply of the grinder (3) by means of pipe (10) and pump (11).

The grinder (3) with micro-elements of the Dyno-Mill type, with a capacity of 50 liters, was composed of a double cylindrical envelope enabling the circulation of a cooling fluid. Inside the double envelope was a turning impeller with a peripheral tangential speed of 16 meters per second.

The grinding micro-elements were corundum bearings with a diameter of from 1.2 to 1.6 millimeters, representing a total weight of 100 kilograms.

The rate at which the micro-elements filled the useful volume was 0.85.

The rate of supply of the suspension to undergo grinding was 1300 kilograms per hour.

The temperature of the suspension in the grinder was maintained at 27° C.±1° C.

At an appropriate level of the grinder (3) with micro-elements, and if such proved necessary, it was possible to introduce into the lime suspension during or after grinding the rheology-modifying agent such that the rheological characteristics of the microparticulate suspension were adapted to the planned use or uses thereof.

Under these conditions, the rheology-modifying agent was introduced into the grinder (3) by means of pipe (12) and dosing pump (13).

The exit of the grinder (3) was connected by pipe (14) to a separation zone (4) enabling the separation of the microparticulate lime suspension through exit (15) and of the micro-elements through exit (16).

The physical and chemical characteristics of the microparticulate suspension obtained after separation in zone (4) were the following:

|  | before grinding | after grinding |
|---|---|---|
| median diameter in μm | 4.85 | 2.2 |
| range of distribution of the microparticulate diameters in μm | 0.5 to 30 μm | 0.4 to 6.5 μm |
| specific surface | 9984 cm$^2 \cdot$ g$^{-1}$ | 21065 cm$^2 \cdot$ g$^{-1}$ |
| viscosity of the suspension | 350 mPs at 100 rpm | 5200 mPs at 10 rpm 550 mPs at 100 rpm |

By way of comparison and under the same technological conditions, an aqueous lime suspension to be refined, free of any grinding agent, but with a very low concentration, was treated in the grinder (3) with micro-elements.

This suspension had the following composition, expressed in weight percent:

| lime (Ca(OH)$_2$ at 100%) | 20% |
|---|---|
| water | 80% |

This suspension, submitted to grinding, could only be introduced into the grinder at a very restricted flow rate of 200 kilograms per hour (while use of a grinding agent of the present invention permitted a flow rate of 1300 kilograms per hour) in order to achieve the characteristics of size of the microparticles which were substantially equivalent to those obtained when a grinding agent of the present invention was used.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of United States is:

1. An aqueous suspension of ground lime, which comprises lime which has been co-ground with an agent, wherein said agent is composed of a water-soluble ethylene polymer or copolymer, and said agent:
   a) is formed from either a monocarboxylic ethylenically unsaturated monomer selected from the group consisting of acrylic acid and methacrylic acid, or from a combination of one of the above and at least one other ethylenically unsaturated monomer copolymerizable therewith which is selected from the group consisting itaconic acid, crotonic acid, fumaric acid, anhydrous maleic acid, isocrotonic acid, aconitic acid, mesaconic acid, sinapinic acid, undecylenic acid, angelic acid, hydroxyacrylic acid, acrolein, acrylamide, acrylonitrile, C$_1$-C$_8$ acrylate and methacrylate esters, quaternized or non-quaternized dimethylaminoethyl methacrylate, imidazoles, vinylpyrrolidone, vinylcaprolactam, ethylene, propylene, isobutylene, diisobutylene, vinyl acetate, styrene, α-methylstyrene, methyl vinyl ketone, vinyl chlorides, ethylene glycol acrylates and methacrylates, propylene glycol acrylates and methacrylates, and the phosphate, phosphonate, phosphonyl, sulfate, sulfone, nitrate and nitroso derivatives thereof, and
   b) has an average molecular weight of between 200 and 1,900 g/mol which is present in the amount of 0.05% to 2% by weight based upon the dry weight of said lime and wherein said lime is present in an amount at least of 40% by weight based on a total weight of the suspension, and has a medium particle diameter in said suspension of less than 4.0 μ.

2. The aqueous suspension of lime in accordance with claim 1, wherein said monocarboxylic ethylenically unsaturated monomer is one member selected from the group consisting of acrylic acid and methacrylic acid.

3. The aqueous suspension of lime in accordance with claim 1, wherein said agent has a molecular weight of between 500 and 1,500.

4. The aqueous suspension of lime in accordance with claim 1, wherein said agent is at least partially neutralized by a neutralizing agent having a monovalent function.

5. The aqueous suspension of lime in accordance with claim 4, wherein said neutralizing agent contains a cation which is one member selected from the group consisting of lithium, sodium, potassium, and ammonium.

6. The aqueous suspension of lime in accordance with claim 1, wherein said agent is at least partially neutralized with a monovalent neutralizing agent and a polyvalent neutralizing agent.

7. The aqueous suspension of lime in accordance with claim 6, wherein said polyvalent neutralizing agent contains a cation which is one member selected from the group consisting of calcium, magnesium, zinc, and aluminum.

8. The aqueous suspension of lime in accordance with claim 1, wherein the amount of said agent is from 0.5 to 1.5% by weight based on the dry weight of said lime.

9. The aqueous suspension of lime in accordance with claim 1, wherein said lime has a median particle diameter less than 2.9 microns.

10. The aqueous suspension of lime in accordance with claim 9, wherein the concentration of dry matter is between 40% and 60% by weight.

* * * * *

UNITED STATES PATENT AND TRADEMARK OFFICE
CERTIFICATE OF CORRECTION

PATENT NO. : 5,275,650
DATED : January 4, 1994
INVENTOR(S) : Jacques Mongoin et al It is certified that error appears in the above-indentified patent and that said Letters Patent is hereby corrected as shown below:

Column 1, line 35, "small amount water" should read --small amount of water--.

Column 5, line 57, "based the dry" should read --based on the dry--.

Signed and Sealed this

Second Day of May, 1995

Attest:

BRUCE LEHMAN

*Attesting Officer*   *Commissioner of Patents and Trademarks*